United States Patent [19]
Upatnieks

[11] 4,223,975
[45] Sep. 23, 1980

[54] ABERRATION CORRECTION OF MAGNIFIED HOLOGRAPHIC IMAGES

[75] Inventor: Juris Upatnieks, Ann Arbor, Mich.

[73] Assignee: Environmental Research Institute of Michigan, Ann Arbor, Mich.

[21] Appl. No.: 945,686

[22] Filed: Sep. 25, 1978

[51] Int. Cl.² .................. G03H 1/12; G02B 5/32; G03H 1/22
[52] U.S. Cl. ................. 350/3.68; 350/3.70; 350/3.85
[58] Field of Search ........... 350/3.68, 3.67, 3.60, 350/3.70, 3.71, 3.85, 3.86

[56] References Cited
U.S. PATENT DOCUMENTS

| | | | |
|---|---|---|---|
| 3,633,986 | 1/1972 | Broussaud et al. | 350/3.68 |
| 4,012,150 | 3/1977 | Upatnieks | 350/3.70 |

*Primary Examiner*—Ronald J. Stern
*Attorney, Agent, or Firm*—Krass & Young

[57] ABSTRACT

In the process of reconstruction of a virtual image of a light line having one end disposed at infinity with respect to the observer from a hologram of a shorter light line by shifting the position of the reconstructing light source relative to the hologram with respect to the position of the reference beam during formation of the hologram, aberrations are introduced which vary the attitude of the line image and the location of its end point as a function of the position of the observer with respect to the hologram. To correct the position of the infinity point in the image, a holographic optical element is formed using a two-step process. First a hologram is formed of a light source at apparent infinity. Next the conjugate aberrated image of the reference source used to form that hologram is reconstructed by illuminating the hologram with a beam different from the object beam, and finally, a second hologram is formed of the aberrated reference source thereby reconstructed and this second hologram is illuminated with a light beam conjugate to the reference beam used in its formation to produce either a reference beam for the formation of the light line hologram or a reconstruction beam for a conventional light line hologram.

8 Claims, 6 Drawing Figures

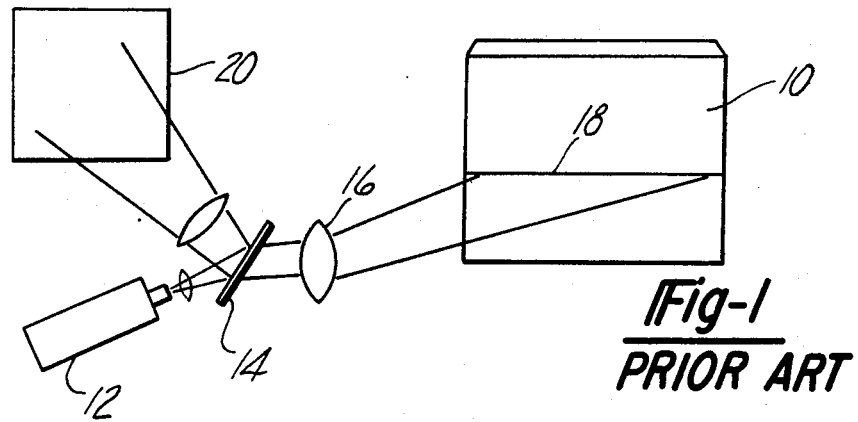
*Fig-1*
PRIOR ART
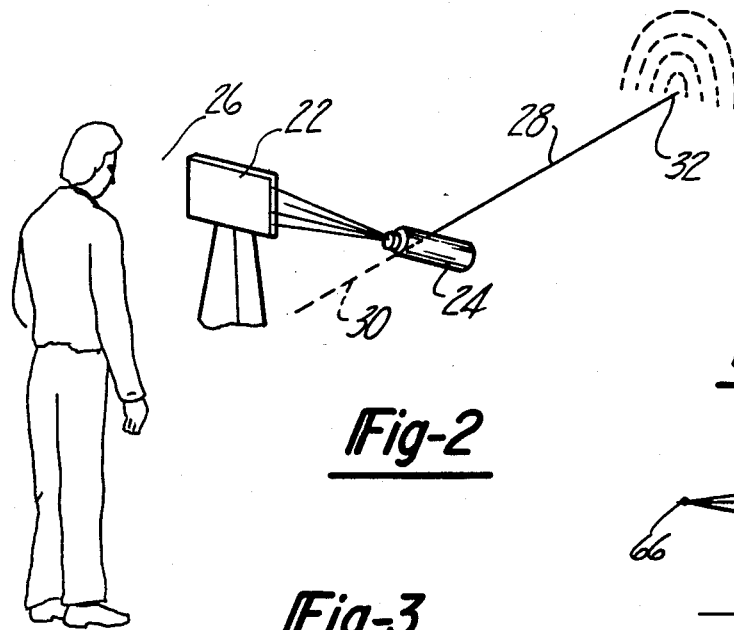
*Fig-2*
*Fig-5*
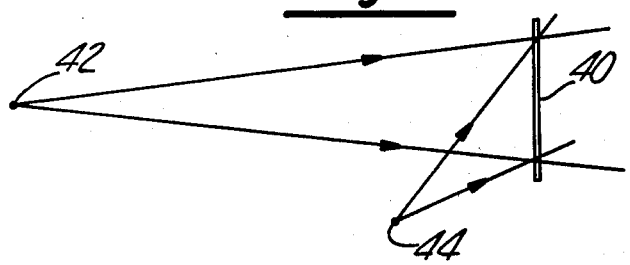
*Fig-3*
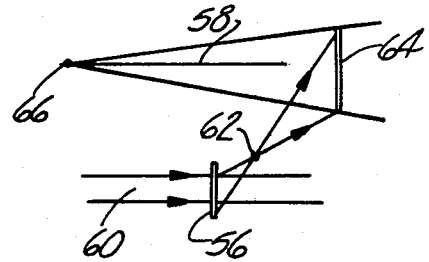
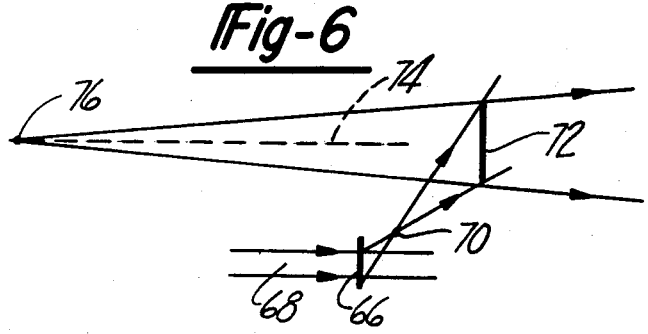
*Fig-6*
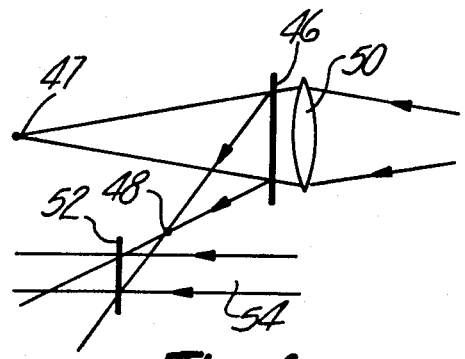
*Fig-4*

ABERRATION CORRECTION OF MAGNIFIED HOLOGRAPHIC IMAGES

BACKGROUND OF THE INVENTION

1. Field of the Invention

This invention relates to methods and apparatus for correcting the aberration produced when a hologram is reconstructed using a light source displaced with respect to the hologram differently than the position of the reference beam during construction of the hologram and more particularly to a holographic method of producing a correction plate for use in the process to eliminate the aberrations.

2. Prior Art

Holograms are formed by photographically recording a coherent interference pattern between an object beam of light and a reference beam, and after development of the hologram light wavefronts which are the equivalent of the original object beam may be reconstructed by illuminating the hologram with a reconstructing light beam. The reconstructed light wavefronts will be distorted with respect to the object wavefronts if the nature of the reconstructing beam differs from that of the reference beam. In most situations this distortion is avoided by employing the same geometry for reconstruction as was used for formation of the hologram, but in certain circumstances the distortion which results from a modification of this geometry may be desirable.

For example, my U.S. Pat. No. 4,012,150 discloses a sight useful for purposes such as aiming guns, employing a hologram which records a single line of light. In use, the line reconstructed from the hologram appears to extend away from the observer toward a point located at infinity. Since it is virtually impossible to form the hologram by using a model line which extends in the same manner as the reconstructed line, the patent discloses a method of forming the hologram of a relatively short line, i.e., one or two meters long, which may be conveniently formed in a laboratory. During reconstruction the apparent position of the reconstructing beam is modified with respect to the apparent position of the reference beam during formation of the hologram to effectively enlarge the reconstructed light line relative to the original line used to form the hologram. This enlargement extends the far end of the line to a very large distance, virtually infinity, with respect to the observer.

This process of enlargement of the image reconstructed from a hologram relative to the image of an object used to form the hologram, by modifying the reconstructing geometry, results in a class of undesirable distortions or aberrations in addition to the desired image enlargement. These aberrations were analyzed and classified in a paper by Edwin B. Champagne entitled *A Qualitative and Quantitative Study of Holographic Images*, Technical Report AFALTR-67-107, Air Force Avionics Laboratory, Wright-Patterson Air Force Base, Ohio, July, 1967. This paper provides formulas for quantifying the spherical aberration, coma, and astigmatism produced by modifying the reconstructing geometry relative to the taking geometry for a hologram.

In terms of this light line sight, these aberrations result in parallax between the end of the light image and an object viewed through the hologram even if both are at the same distance as the observer, and a variation in the apparent distance from the hologram to the far end of the line image as the observer views the line image through different parts of the hologram. These effects reduce the accuracy of the light line if it is used as a sight or an instrument for range measurement.

The present invention is addressed to the solution of this problem by the provision of a method and apparatus for eliminating the aberrations at at least one point in an enlarged holographic image.

SUMMARY OF THE INVENTION

The present invention is broadly directed toward the use of specially formed holographic optical elements during either the formation of a hologram that is intended to be displayed with some reconstruction geometry that differs from the taking geometry, or to be used in the reconstruction of that hologram, in order to eliminate the aberrations which would otherwise occur with respect to at least one selected point of the reconstructed image. The method of the present invention also descreases the distortion at other points in the reconstructed image.

The special holographic optical element records the image of a special point source which may be reconstructed to provide the source of either the reference beam during taking of the hologram or the reconstructing beam during reconstruction of the hologram. Broadly, the holographic optical element is constructed by recording the image of a point source located at the point to be corrected in the enlarged reconstructed image. In the case of the light line, it is generally desirable to correct the end point of the line that is located at infinity, and accordingly the first step in the preparation of the holographic optical element is to record the image of a point source at infinity, i.e., one sufficiently displaced from the photographic media so that wavefronts reaching the media from the point are essentially planar. The second step in the formation of the special holographic optical element involves the reconstruction of the conjugate of the reference beam employed in the formation of the first hologram by illuminating the first hologram with a light beam having opposite direction to and a different curvature from that of the object point source. In particular, the curvature is chosen such that this beam focuses to a point where the far end of the light line is located in the recording step of making the light line hologram. The reconstructed reference point is typically highly aberrated but has the needed properties to correct the final image. Then a second hologram is formed of this conjugate point source. When this second hologram is reconstructed employing a reconstructing beam that is conjugate to the reference beam employed during the formation of the hologram, the reconstructed point can be used as either a reference beam for the formation of a hologram or as a reconstructing beam for a conventional hologram. The point on the resulting enlarged holographic image which corresponds to the point that was recorded on the first hologram in the formation of the holographic optical element, will be reproduced without aberration and the aberration of other points on the image will be reduced as a function of their distance from this corrected point.

Other objectives, advantages and applications of the present invention will be made apparent by the following detailed description of a preferred embodiment of the invention. The description makes reference to the accompanying drawings in which:

FIG. 1 illustrates the prior art method of formation of a light line hologram;

FIG. 2 is a perspective view of an observer viewing the enlarged light line image produced from the hologram of FIG. 1;

FIG. 3 is a schematic diagram illustrating the first step in the process of forming a holographic optical correcting element for use with the present invention;

FIG. 4 is a schematic diagram of the second step used in the formation of a holographic optical correcting element used in the present invention;

FIG. 5 is a schematic diagram illustrating the formation of the light line hologram in accordance with the method of the present invention, employing a holographic optical correcting element formed in accordance with the process illustrated in FIGS. 3 and 4; and FIG. 6 is a schematic diagram of an alternative embodiment of the invention wherein the conventionally formed light line is reconstructed employing a holographic optical correcting element formed in accordance with the method of FIGS. 3 and 4.

Considering first the prior art method of forming a light line hologram, a variety of techniques are available, some of which are disclosed in my U.S. Pat. No. 4,012,150. FIG. 1 illustrates a typical method. A thin sheet of PLEXIGLAS 10 is illuminated along one side by a beam derived from a laser 12. The laser beam is passed through a beam splitter 14 and the transmitted portion is focused by an optical element 16 into a narrow line which grazes one edge of the plate 10 at a narrow angle. The opposite edge of the plate 10 may be masked to leave a narrow slit 18 and that slit is preferably roughened to form a diffuse illuminating surface.

A photographic plate 20 is positioned to receive light transmitted by the illuminated slit 18 as well as a reference beam of light from the beam splitter 14. The photographic plate 20 thus records a hologram of the slit line 18.

The manner of use of the holographic light line is illustrated in FIG. 2. The hologram 22 which results from development of the photographic plate 20 is illuminated by a beam from a laser 24. This beam preferably makes the same angle with respect to the hologram 22 as did the reference beam used in formation of the hologram, but the optics associated with the laser 24 are such as to render the apparent source of the reconstructing light beam at a greater distance from the hologram than the apparent separation of the reference beam from the photographic plate during the formation of the hologram. This enlarges the virtual image of the light line and an observer 26 viewing through the hologram sees an image of the line 28 having one end 30 relatively close to him and the other end 32 arrayed at apparent infinity. The observer uses the light line by aligning his head relative to the hologram to bring the infinite end of the line 32 into superposition with some target in the area viewed through the hologram, or by bringing points along the light line, defined by suitable indicia, into alignment with other points.

The aberrations in the point 32 result in apparent differences between its position in the viewed line and infinitely displaced points in the scene viewed through the hologram and also result in differences in the apparent end point position based on the position of the observer's head relative to the hologram. The degree of these aberrations depend upon the recording and reconstructing geometry and the aberrations, relative to a reference sphere, may be calculated by using the analysis given in Paper 1.

In the formation of a typical light line the angle of the reference beam relative to the photographic plate was chosen to be 26.3°, the angle of the object beam relative to the hologram 10°, the distance from the photographic plate to the far end of the line was 280 centimeters, and the distance from the apparent source of the reference point to the photographic plate was 32.8 centimeters. With a hologram diameter of 2.5 inches the equations of reference 1 indicate that the spherical angular error is 0.82 mils, the coma angular error is 4.5 mils and the astigmatism angular error is 3.7 mils when the line length is magnified to infinity. These are substantially greater than the resolution ability of the human eye and the resolution of the eye is increased when a telescope or binoculars are used to view through the light line hologram.

In order to correct these aberrations the present invention generates a holographic optical element through one of two processes, depending upon whether the element is to be used in the formation of the light line hologram or in its reconstruction. The first step in the formation of the holographic optical element to be used to form a corrected light line hologram is illustrated in FIG. 3. A first hologram element is formed on a plate 40 using a point source 42 sufficiently displaced from the hologram so that wavefronts reach the hologram as planar waves. This is the equivalent of a point located at infinity. A reference beam from an apparent source 44 is employed and the angle of the reference beam relative to the photographic plate 40 is chosen as the same angle that is to be used during the formation and reconstruction of the light line hologram.

Photographic plate 40 is then developed to produce a first hologram element 46 illustrated in FIG. 4. An aberrated image of a point 48 is formed by the hologram element 46 by illuminating the hologram element from its rear side (the side opposite the point 42 in FIG. 3) with a beam that focuses at point 47 which is at the same distance from plate 46 as is point 66 from plate 64 in FIG. 5. This is generated by a lens 50 using a suitable light source.

The point source 48 is used to form a second hologram element by illuminating a photographic plate 52 with light from the point source and a beam 54 of plane wave light. Upon development of the photographic plate 52 a second hologram element 56 results. This second hologram element may be used in the process illustrated in FIG. 5, to form a light line hologram.

In FIG. 5, the second element hologram 56 is used to generate a reference beam for the formation of a hologram of a relatively short light line 58. The reference source is generated by illuminating the hologram element 56 with a light beam 60 that is conjugate to the light beam 54 used as the reference beam in the formation of hologram 56. This reconstructs an aberrated point source 62 which is effectively the conjugate 48 in FIG. 4. The resultant reference beam illuminates the photographic plate 64 which is also illuminated by the object beam derived from the light line 58. When the photographic plate 64 is developed to form a light line hologram, upon reconstruction the far end point of the light line will be effectively placed at infinity and will be free of aberrations.

Considering the manner that this aberration correction operates, it may be noted that the hologram 64 is a recording that contains identical wavefronts to those present at the first hologram element 46 in FIG. 4. It is obvious then that if hologram 64 is illuminated with a point source corresponding to the point 44 in FIG. 3, a point of equal quality to that of the point 42 will be generated by the hologram 64 at infinity. Thus, exact correction is achieved and in principle all aberration coefficients for the end point of the line are reduced to zero. While the aberrations for other points on the line cannot be readily calculated, this technique also reduces them.

In forming a holographic optical element that can be used to reconstruct a light line with a corrected end point at infinity from a conventional light line hologram, of the type made in FIG. 1, the process of FIGS. 3 and 4 is repeated but the first hologram element 46 is made with a point source 42 at a distance corresponding to the end point of the original light line. The beam that illuminates the first hologram element 46 converges to a point at the distance corresponding to the end point of the magnified light line. The hologram 64, which is recorded with a point reference, is then illuminated by the conjugate aberrated waveform generated by the second hologram element 56. This is illustrated in FIG. 6. The resultant holographic optical element 66 is illuminated by a plane light wave 68 to generate an aberrated point source 70. The point source illuminates the conventional light line hologram 72 to produce a magnified image of a light line 74 with the end point corrected to infinity as at 76.

The embodiments of the invention in which an exclusive property or privilege is claimed are defined as follows:

1. In the method of forming an enlarged virtual image of an object by forming a first hologram of light reflected from a smaller model of the object and reconstructing the larger image from the first hologram by use of an illuminating light beam having a different geometry relative to the first hologram than the reference beam used during the formation of the first hologram, the improvement comprising: correcting one point in said virtual image for aberrations resulting from the enlargement process by use of an illuminated holographic optical element as a light source during one stage of the method, the holographic optical element being formed by illuminating a second hologram of a point source, that point source bearing the same relation to the photographic plate employed to form the second hologram as the desired corrected point on said virtual image reconstructed from said first hologram bears to an observer, with a reconstructing beam conjugate to the object beam; forming a third hologram of the reference source thereby reconstructed, said third hologram constituting said holographic optical element; and illuminating the third hologram with a light beam conjugate to the reference beam used in its formation.

2. The method of claim 1 wherein the illuminated holographic optical element is employed as a light source during formation of said first hologram.

3. The method of claim 1 wherein the illuminated holograpic optical element is employed as a illuminating light source during reconstruction of the larger image from the first hologram.

4. The method of claim 1 wherein said smaller object of the model comprises a line of light, and the enlarged virtual image comprises a longer line of light.

5. The method of claim 4 wherein the far end of the enlarged virtual image of the line of light is located at infinity and that end of the line of light is the point in the virtual image corrected for aberrations by the method of the invention.

6. The method of forming a holographic optical element useful for correcting the aberrations occurring in one point of an enlarged virtual image reconstructed from a first hologram of light reflected from the smaller object of the model by use of a reference light beam having a different geometry relative to the first hologram than the reference beam during the formation of the first hologram, comprising: forming a second hologram of a point source bearing the same relation to the photographic plate used to form the second hologram as the corrected point of the virtual image bears to the first hologram; illuminating the second hologram with a reconstructing beam in the opposite direction to the object beam used during formation of the second hologram; and forming a third hologram of the reference source thereby reconstructed, whereby said third hologram may be illuminated with a light beam conjugate to the reference beam used in its formation to form a light source for use in said method of forming an enlarged image.

7. The holographic optical element of claim 6 wherein the corrected point on the virtual image is at infinity and the second hologram is formed of a light source that is displaced with respect to the photographic plate used to form it sufficiently so that light rays intersecting the photographic plate from the source are substantially parallel to one another.

8. Apparatus for forming a virtual image of a line having one end disposed at infinity with respect to an observer from a hologram of a shorter light line comprising: a holographic optical element formed by illuminating a first hologram of a point source on a photographic plate, the point source being displaced sufficiently from the photographic plate so that lines from the source to the plate extend substantially parallel to one another, illuminating the first hologram with a reconstructing beam of opposite direction to the object beam from the point source, and forming a second hologram of a reference source thereby reconstructed; and a third hologram formed of the relatively short light line formed by illuminating the second hologram of a light beam conjugate to the reference beam and used in its formation to create a reference beam for formation of the third hologram.

* * * * *